J. D. MASON.
Baking-Pans.
No. 148,228. Patented March 3, 1874.
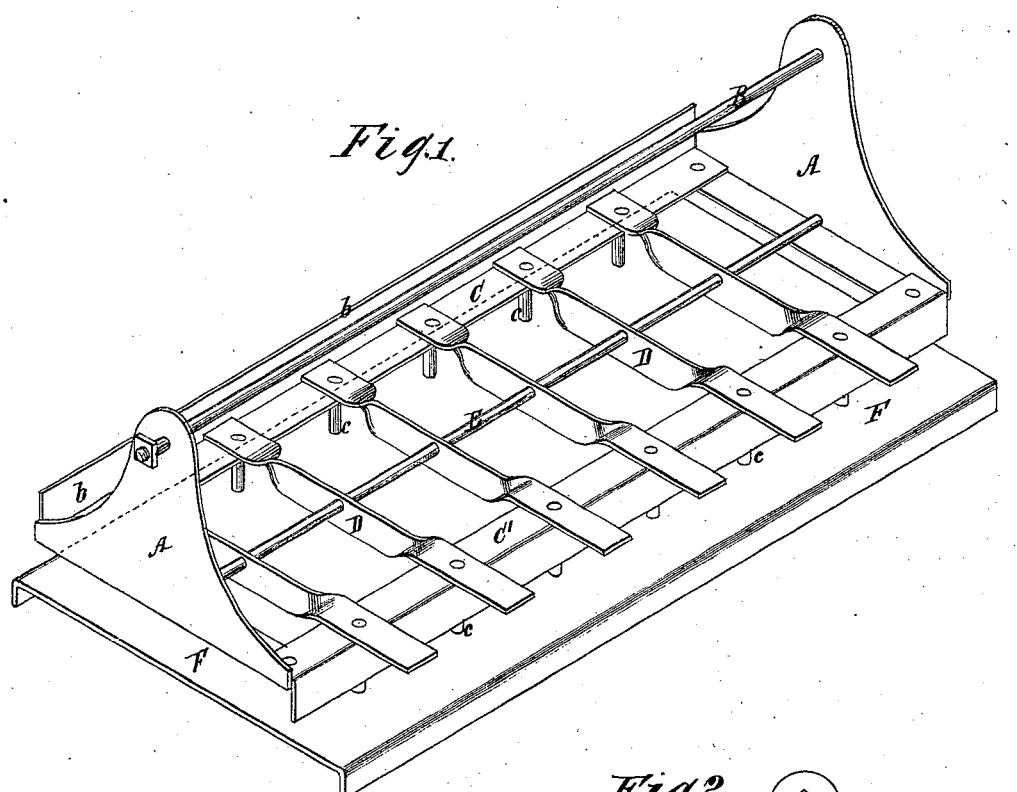
Witnesses:
G. Matthys.
A. W. Hart
Inventor:
James D. Mason
Per
Attorneys.

UNITED STATES PATENT OFFICE.

JAMES D. MASON, OF BALTIMORE, MARYLAND.

IMPROVEMENT IN BAKING-PANS.

Specification forming part of Letters Patent No. 148,228, dated March 3, 1874; application filed July 29, 1873.

*To all whom it may concern:*

Be it known that I, JAMES D. MASON, of the city of Baltimore and State of Maryland, have invented a new and Improved Pan for Bakers' Ovens; and I do hereby declare the following to be a full, clear, and exact description of the same, reference being had to the accompanying drawing, forming part of this specification, in which—

Figure 1 is a perspective view of an open-work pan with a shield attached, and Fig. 2 is a cross-section of the same.

My invention relates to the mode of attachment of a protecting plate or shield to a pan for reel-ovens, as hereinafter described.

In the drawing, the pan A is shown suspended from rod B, and formed of longitudinal bars C C′, cross-bars D, and central rod E. The bar C has an upwardly-projecting flange, $b$, to act as a stop for the bread-pan when slid onto the frame. The shield F is a flat rectangular plate, whose longer sides are bent down at right angles. It is attached to the pan A by screw-bolts passing through short tubes $e$, by which the two are held apart.

When bread and like articles are to be baked in the oven in which the pan is used, the shield is requisite to attainment of a proper effect; but, when crackers and similar articles are to be baked, and a quick heat is consequently required, the shield is removed to allow direct action of heat on the bottom of the dough pan or plate.

It will be seen that the space between the pan and shield is open around the sides, so that the heated air has free access to the bottom of the former, while direct impingement of flame thereon is prevented, as well as the injurious effect of the excess of heat in the lower part of the oven in which the reel revolves.

I do not claim a pan provided with a removable bottom, separated therefrom by blocks or other equivalent devices, to form an air-space between them.

What I claim is—

The combination, with the pan A, of the detachable shield F, tubes C, and screw bolts and nuts, all arranged as shown and described, whereby the heated air has free admission between the pan and shield around the sides thereof, as specified.

JAMES D. MASON.

Witnesses:
WM. S. MURPHY,
JNO. T. MADDOX.